United States Patent
Malm et al.

(10) Patent No.: US 7,154,966 B2
(45) Date of Patent: Dec. 26, 2006

(54) METHOD AND SYSTEM FOR M-QAM DETECTION IN COMMUNICATION SYSTEMS

(75) Inventors: Peter Malm, Lund (SE); Bengt Lindoff, Bjärred (SE); Andreas Cedergren, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 750 days.

(21) Appl. No.: 10/609,917

(22) Filed: Jun. 30, 2003

(65) Prior Publication Data

US 2004/0264591 A1    Dec. 30, 2004

(51) Int. Cl.
*H03D 1/00* (2006.01)

(52) U.S. Cl. .................. 375/340; 375/324

(58) Field of Classification Search .......... 375/340, 375/261, 332, 265, 243, 222, 344; 329/304; 340/825.21
See application file for complete search history.

(56) References Cited

U.S. PATENT DOCUMENTS

| | | | |
|---|---|---|---|
| 3,955,141 A * | 5/1976 | Lyon et al. ................ 375/261 |
| 4,853,686 A * | 8/1989 | Kueng et al. .......... 340/825.21 |
| 5,309,481 A * | 5/1994 | Viviano et al. ............. 375/344 |
| 5,519,356 A * | 5/1996 | Greenberg ................ 329/304 |
| 5,742,643 A * | 4/1998 | Reeves et al. .............. 375/243 |
| 5,832,041 A * | 11/1998 | Hulyalkar ................ 375/340 |
| 5,875,215 A | 2/1999 | Dobrica |
| 6,304,594 B1 * | 10/2001 | Salinger ................... 375/222 |
| 6,351,458 B1 | 2/2002 | Miya et al. |
| 6,411,649 B1 | 6/2002 | Arslan et al. |
| 6,430,214 B1 | 8/2002 | Jalloul |
| 6,625,225 B1 * | 9/2003 | Fukuda ..................... 375/265 |
| 6,636,570 B1 * | 10/2003 | Choi et al. ................ 375/332 |
| 6,690,738 B1 * | 2/2004 | Swenson et al. ........... 375/265 |
| 6,907,084 B1 * | 6/2005 | Jeong ....................... 375/261 |
| 2004/0066861 A1 | 4/2004 | Song |

FOREIGN PATENT DOCUMENTS

| | | |
|---|---|---|
| EP | 0.716 520 A1 | 6/1996 |
| EP | 0 887 976 A | 12/1998 |
| EP | 1 420 558 A | 5/2004 |
| JP | 2001077744 | 3/2001 |

(Continued)

OTHER PUBLICATIONS

Bernardini, De Fina, "Optimal decision boundaries for M-QAM signal formats using neural claddifiers" IEEE Transactions of Nueral Networks, col. 9, No. 2, Mar. 1998: 241-246; XP002272535.

(Continued)

*Primary Examiner*—Tesfaldet Bocure
*Assistant Examiner*—Sudhanshu C. Pathak
(74) *Attorney, Agent, or Firm*—Potomac Patent Group PLLC

(57) ABSTRACT

A method and system are described for performing fast and simple M-QAM detection on received signals, such as a 16-QAM signal, by estimating M-QAM symbol constellation decision boundaries. Amplitude information is collected for in-phase and quadrature phase components of the received signal over a number of symbols. An average of the absolute value of the amplitude information of the in-phase components and of the quadrature phase components is determined over the number of symbols. The determined average absolute values of the in-phase and quadrature phase components provide a reference to produce the decision boundary estimates. Bias compensation may optionally be applied to the decision boundary estimates based on the estimated signal-to-interference ratio ("SIR") of the received signal to produce bias corrected decision boundary estimates.

30 Claims, 6 Drawing Sheets

FOREIGN PATENT DOCUMENTS

WO  02/33919 A2  4/2002
WO  WO 2004/054194 A  6/2004

OTHER PUBLICATIONS

Nakhjiri, Madjud Faghih, "Decision Directed Coherent Detection of 16-QAM on Fading Channels", IEEE Vehicular Technology Conference, Apr. 28, 1996-May 1, 1996: 988-992; XP01016537.

Tsukakosh, Kazuaki et al. "Performance of DS-CDMA Aadaptive Modulation System in a Multi-path-Channel Environment", IEICE Trans. Commun., vol. E86-B No. 2, Feb. 2003 pp. 743-756.

"A Method for Blind Determination of Pilot to Data Power Ratio for QAM Signals," TSG-RAN Working Group 1 #21, Turin, Italy, Aug. 27-31, 2001.

* cited by examiner

METHOD AND SYSTEM FOR M-QAM DETECTION IN COMMUNICATION SYSTEMS

BACKGROUND

The invention relates to detection of modulated signals for use in radio communication. More particularly, the invention relates to multi-level quadrature amplitude modulation ("M-QAM") detection in communication systems.

In a digital communication system, digital symbols representing information are transmitted between different nodes (e.g., base stations, mobile phones) to exchange information.

A layered model often referred to as the Open System Interconnection ("OSI") model is often used to describe communication systems. The lowest layer in that model, where information streams consisting of bits are transmitted, is often referred to as the physical layer, and information is often transmitted on different physical channels. A physical channel provides services with a predefined quality, depending on the arrangement. In a simplified description, a physical channel includes the formatting of bits in a predefined format, coding, interleaving, modulation of a carrier, transmission over a medium, down-conversion, demodulation, de-interleaving, and forward error correction. In addition, there are many other functions that are required for proper operation, such as synchronization in both time and frequency and channel estimation. Pilot symbols are often transmitted among information symbols on the physical channels. These pilot symbols are then used in the receiver to obtain synchronization and channel estimates. The channel estimates describe how the transmitted symbols are affected by the channel (including the modulation, TX front-end, medium, RX front-end, and demodulator), and are used to reconstruct the signal in the receiver. Put another way, the channel estimates help determine the radio channel's response so it can be compensated at the receiver.

Physical channels can be of three types, dedicated channels, shared channels, and broadcast channels. Broadcast channels carry common information to all or a group of users, while shared channels are data channels that can be used by many users. Dedicated physical channels are used by only one user at a time.

A medium carries the electromagnetic or optical signal between the antennas of the different nodes. In radio communication systems the medium consists of "free-space" and the signal is electromagnetic waves propagating in this medium.

A base station most often transmits using multiple physical channels. In time division multiple access ("TDMA") systems, physical channels from the same base station are separated using time (and frequency if multiple carriers are used). In frequency division multiple access ("FDMA") systems, only frequency is used to separate different physical channels. In code division multiple access ("CDMA") systems, codes are used to separate different users (and frequency if multiple carriers are used).

At the receiver, a received signal is processed to obtain a sequence or stream of digital samples, called here "received samples" or a "received sample stream," and these samples may be represented as complex numbers. For example, the received signal may be filtered, amplified, and mixed down to baseband using in-phase and quadrature local oscillators, and after analog-to-digital ("A/D") conversion and synchronization processing, a stream of complex received samples is obtained. Each sample in the complex sample stream r(n) may be represented as a sum of a real component and an imaginary component, that is, $r(n)=I(n)+jQ(n)$, where $I(n)$ represents the in-phase components of the samples, $Q(n)$ represents the quadrature components of the samples, and n is a sample time index.

Newer third generation ("3G") cellular communications systems predominantly employ wideband code division multiple access ("WCDMA") technology. An extension to the WCDMA standard known as high speed downlink packet access ("HSDPA") has recently been standardized within the Third Generation Partnership Project ("3GPP") standardization organization. HSDPA introduces known technologies such as higher order modulation and incremental redundancy to the 3GPP universal mobile telecommunications system ("UMTS") standard. The higher order modulation introduced in HSDPA is M-QAM, and more particularly 16-state quadrature amplitude modulation ("16-QAM"), which in effect doubles the number of bits that can be transferred per radio channel use over prior systems.

Generally speaking, 16-QAM is achieved by modulating two four-level pulse amplitude modulated ("PAM") signals onto two respective orthogonal carriers (I and Q), providing $4^2=16$ possible symbol representations. Accordingly, a 16-QAM symbol includes phase information based on the respective I or Q orthogonal carrier and amplitude information. Quadrature phase shift keying ("QPSK") detection, by comparison, includes only phase information.

Receivers in WCDMA systems also rely on a reference signal, such as time-multiplexed pilot symbols or a code-multiplexed pilot channel, to calculate estimates of a radio channel's response. Typically, the channel gain and phase of the common pilot channel ("CPICH") is estimated once per slot for this purpose. The CPICH is a QPSK-modulated channel that includes only the relevant phase information, and therefore only provides a phase reference. The 16-QAM data, which is transferred on the high speed physical downlink shared channel ("HS-PDSCH"), requires processing of phase and amplitude information to recover the information in the data. The gain offset between the CPICH and HS-PDSCH, which is unknown to the receiver, must therefore be determined in order to establish an amplitude reference in addition to the phase reference for channel estimation and symbol detection.

Without an estimate of the gain offset, the decision boundaries for the corresponding 16-QAM constellation cannot be established for proper detection. An example of a normalized 16-QAM constellation having average power $\bar{E}_s=2$ is shown in FIG. 1. The constellation includes 16 equi-probable constellation points 100–115 and a grid of decision boundaries 120–125. Since the radio channel changes the gain and phase of the original signal over time, the decision boundaries 120–125 must be updated continuously, which requires information to be stored until the decision boundaries 120–125 can be estimated. Consequently, as the speed at which the CPICH/HS-PDSCH gain difference is estimated increases, the memory requirements in the receiver are decreased. It is therefore advantageous to estimate the gain difference as fast as possible to realize this savings in overhead. The gain difference estimator should therefore be able to estimate the gain difference fast, preferably within about half a slot.

Some methods have been disclosed for estimation of decision boundaries in M-QAM. For example, in "A Method for Blind Determination of Pilot to Data Power Ratio for QAM Signals," TSG-RAN Working Group 1 #21, Aug. 27–31, 2001, estimation of the decision boundaries is based on an estimation of the ratio between the pilot channel's power and the data channel's power. Disadvantages of this approach include the fact that both a filtering and a division between two estimated values are required. The method is therefore quite complex and results in the production of noisy decision boundary estimates.

Other estimation methods require the estimation of the decision boundaries to be based on signal power estimation followed by a non-linear transform of the estimate. Disadvantages of this approach also include complexity and noisy estimates resulting from the non-linear transformations.

The problem with previous approaches is the required complexity of calculation, which results in slower estimation speeds, which results in increased overhead in terms of memory, and noisy decision boundary estimates. A need therefore exists for faster, simpler, and less noise prone M-QAM detection in communication systems.

SUMMARY

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

A system and method for performing fast and simple M-QAM detection on received signals, such as a 16-QAM signal in a CDMA system or, more particularly, in an HSDPA-enabled WCDMA system is described. In accordance with one aspect, a method for estimating M-QAM symbol constellation decision boundaries for a received signal includes determining amplitude information for in-phase and quadrature phase components of the received signal over a number of symbols. An average of the absolute value of the amplitude information of the in-phase components over the number of symbols is determined. An average of the absolute value of the amplitude information of the quadrature phase components is determined over the number of symbols. A reference coordinate is determined for producing the decision boundary estimates based on the determined average absolute values of the in-phase and quadrature phase components.

According to another aspect, a system for estimating M-QAM symbol constellation decision boundaries for a received signal includes logic that determines amplitude information for in-phase and quadrature phase components of the received signal over a number of symbols. Additional logic is included that determines an average of the absolute value of the amplitude information of the in-phase components over the number of symbols, determines an average of the absolute value of the amplitude information of the quadrature phase components over the number of symbols, and determines a reference coordinate for producing the decision boundary estimates based on the determined average absolute values of the in-phase and quadrature phase components.

According to yet another aspect, a method for estimating M-QAM symbol constellation decision boundaries for a received signal includes determining amplitude information for in-phase and quadrature phase components of the received signal over a number of symbols. An average of the absolute value of the amplitude information of the in-phase components and of the quadrature phase components is determined together over the number of symbols. A reference coordinate is determined for producing the decision boundary estimates based on the determined average absolute values of the in-phase and quadrature phase components.

According to still another aspect, a system for estimating M-QAM symbol constellation decision boundaries for a received signal includes logic that determines amplitude information for in-phase and quadrature phase components of the received signal over a number of symbols. Additional logic is included that determines an average of the absolute value of the amplitude information of the in-phase and the quadrature phase components over a number of symbols, and determines a reference coordinate for producing the decision boundary estimates based on the determined average absolute values of the in-phase and quadrature phase components.

According to still another aspect, a computer readable medium contains a computer program for estimating M-QAM symbol constellation decision boundaries. The computer program includes instructions to determine amplitude information for in-phase and quadrature phase components of the received signal over a number of symbols, determine an average of the absolute value of the amplitude information of the in-phase components over the number of symbols, determine an average of the absolute value of the amplitude information of the quadrature phase components over the number of symbols, and determine a reference coordinate for producing the decision boundary estimates based on the determined average absolute values of the in-phase and quadrature phase components.

According to still another aspect, user equipment for estimating M-QAM symbol constellation decision boundaries when a signal is received by the user equipment includes logic that determines amplitude information for in-phase and quadrature phase components of the received signal over a number of symbols. Additional logic is included that determines an average of the absolute value of the amplitude information of the in-phase components over the number of symbols, determines an average of the absolute value of the amplitude information of the quadrature phase components over the number of symbols, and determines a reference coordinate for producing the decision boundary estimates based on the determined average absolute values of the in-phase and quadrature phase components.

Bias compensation may optionally be applied to the decision boundary estimates according to another aspect. The signal-to-interference ratio ("SIR") of the received signal is estimated and used to determine the proper bias compensation, to produce bias corrected decision boundary estimates. For example, a bias compensation value can be selected from a table of predetermined values, where the selected bias compensation value corresponds to a range of SIRs that includes the determined SIR. The selected bias compensation value is applied to the decision boundary estimates.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION

Figure 1:
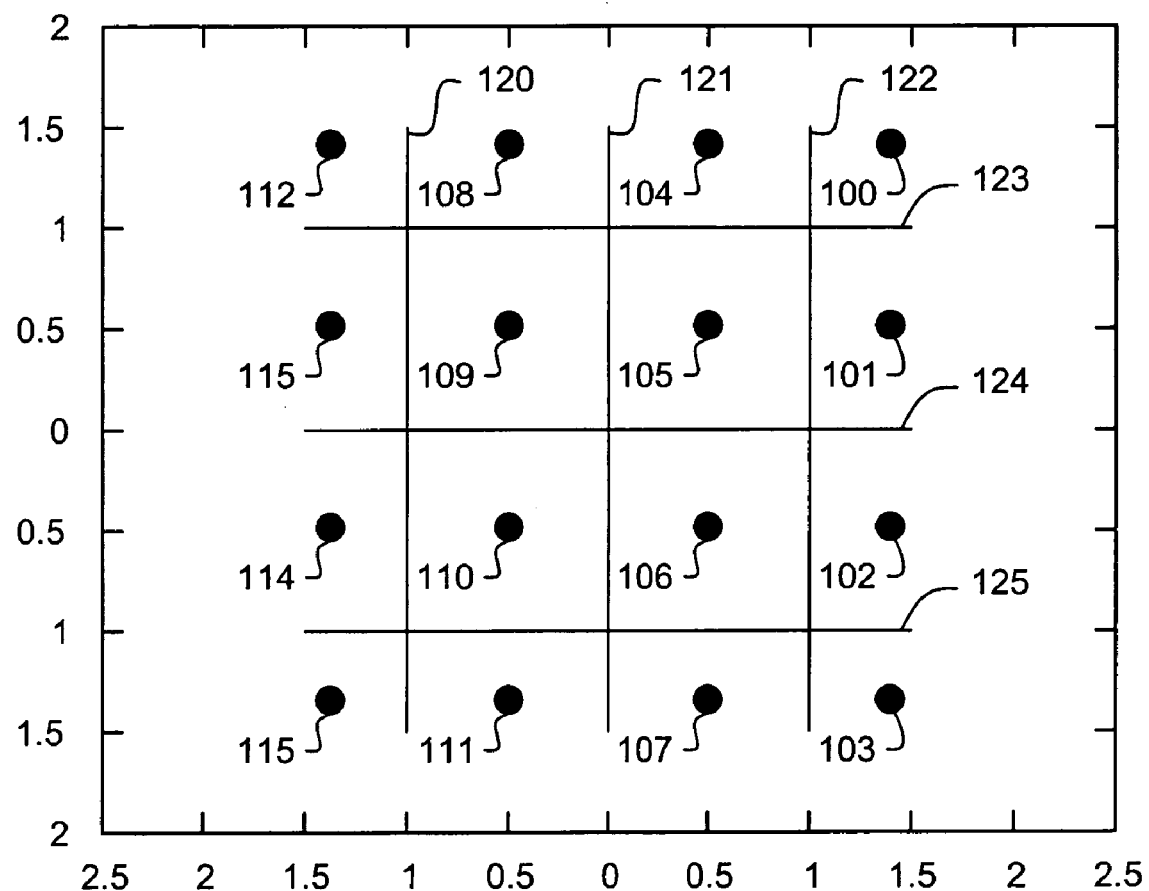
FIG. 1 is a diagram illustrating an example of a normalized 16-QAM constellation.

Various aspects will now be described in connection with exemplary embodiments in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both. Thus, the various aspects can be embodied in many different forms, and all such forms are contemplated to be within the scope of what is described. For each of the various aspects, any such form of embodiment can be referred to herein as "logic configured to" perform a described action, or alternatively as "logic that" performs or "logic capable of" performing a described action.

The sequences of actions can be embodied in any computer readable medium for use by or in connection with an instruction execution system, apparatus, or device, such as a computer based system, processor containing system, or other system that can fetch the instructions from a medium and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

In order to perform detection on an M-QAM signal, such as a 16-QAM, modulated signal, the decision boundaries must be estimated. Estimating the energy first and the decision boundaries later, as in the previous methods, adds unnecessary complication and therefore reduces the estimation speed. According to an aspect of the invention, the phase shift per channel delay is estimated, which provides sufficient information to perform a good estimation of the decision boundaries.

The phase shift per channel delay can be determined from a pilot channel, for example, from the CPICH in a WCDMA system. Mathematically, a k:th data symbol for channel delay i, represented by $d_k^i$, received at a RAKE receiver and despread can be modeled as:

$$d_k^i = \alpha h_i u_k + e_i, \quad i=1, \ldots, N_f \qquad \text{expression (1)}$$

where:

$h_i$ is the complex valued channel tap for finger i;

$u_k$ is the k:th M-QAM symbol;

$e_i$ is noise;

$N_f$ is the number of channel delays identified in the RAKE receiver; and $\alpha$ is a scale factor.

The scale factor $\alpha$ is proportional to the root mean square (RMS) value of data symbols averaged over an entire 16-QAM constellation, such as the HS-PDSCH data symbols. This results in an average power of the actual data symbols being normalized to 1, that is, $\epsilon|u|^2=1$. The channel estimate obtained from the pilot channel is $\hat{h}_i \approx \beta h_i$, where $\beta$ is a scale factor proportional to the RMS value of the pilot symbols. In practice, as applied to a system supporting HSDPA, $\alpha$ is averaged over a 16-QAM constellation, while $\beta$ is averaged over a QPSK constellation.

The combined received value at time k from the RAKE combiner, $d_k$, can then be written as:

$$d_k = \hat{H}^H R_e^{-1} D_k \qquad \text{expression (2)}$$

where:

$\hat{H}^H$ is the estimated channel tap weights $[\hat{h}_1^*, \ldots, \hat{h}_N^*]$;

$R_e$ is the estimated covariance function for noise and interference, and $D_k = [d_k^1, \ldots, d_k^N]^T$.

As can be appreciated by a person skilled in the art, expression (2) comprises an expression of both classical maximal ratio combining, such as $R_e = \text{diag}(\sigma_1^2, \ldots, \sigma_N^2)$, and additional advanced combiner structure, such as G-RAKE. Furthermore, by assuming that the channel estimates are accurate, that is, that $\hat{H}^H \approx \beta [h_i^*, \ldots, h_N^*]$, then expression (2) can be written as:

$$d_k = \{\alpha\beta H^H R_e^{-1} H\} u_k + \beta H^H R_e^{-1} e \qquad \text{expression (3)}$$

Since $\alpha\beta H^H R_e^{-1} H$ is a quadratic form and therefore real-valued, the decision variable is the scale factor $(\alpha\beta H^H R_e^{-1} H)$ multiplied by the M-QAM symbol (in addition to the noise term). Following an assumption that 16-QAM symbols are equi-probable, the grid of decision boundaries can be estimated by determining a reference point, $\hat{D}$, as:

$$\hat{D} = \frac{1}{2N}\left(\sum_{k=1}^{N}|\text{Re } d_k| + \sum_{k=1}^{N}|\text{Im } d_k|\right) \qquad \text{expression (4a)}$$

where N is the number of received despread 16-QAM symbols.

Therefore, according to expression (4a), an estimate of the decision boundaries can be expressed as a reference point in the constellation determined from a single value corresponding to the average of the sum of absolute values of the in-phase (real) component amplitude values, Re $d_k$, and the quadrature phase (imaginary) component amplitude values, Im$d_k$, over N symbols. A single reference value can be used to determine the coordinates of the reference point in the constellation where the constellation is symmetrical, as shown in FIG. 1, since the I and Q coordinates of the reference point are the same. The reference point represents an estimate of a coordinate point of the constellation from which the decision boundaries can easily be calculated. This simplifies computation by taking advantage of inherent symmetries. The constellation is symmetrical when the gain of the I component of a transmitted symbol is substantially equal to the gain of the Q component of a transmitted symbol. The decision boundaries are easily calculated taking the offset into account.

In the case, however, where the signal constellation is not symmetrical, (i.e., there is a gain offset between the I and Q components of the symbol), the amplitude information for each of the I and Q channels are collected and averaged separately. Separate I and Q coordinate values, $\hat{D}_I$ and $\hat{D}_Q$, for the reference point are determined, as shown below.

$$\hat{D}_I = \frac{1}{N}\left(\sum_{k=1}^{N} |\text{Re } d_k|\right), \hat{D}_Q = \frac{1}{N}\left(\sum_{k=1}^{N} |\text{Im } d_k|\right) \quad \text{expression (4b)}$$

Coordinate values, $\hat{D}_I$ and $\hat{D}_Q$ represent a reference point that represents an estimate of a coordinate in the constellation from which the decision boundary grid can be estimated. The decision boundaries are easily calculated taking the offset into account.

In either the symmetrical or the asymmetrical case, the reference point is determined, and the decision boundaries are calculated, without the need for non-linear transformations as in prior methods. The associated calculations are very simple to derive and implement in hardware or software.

Figure 2:
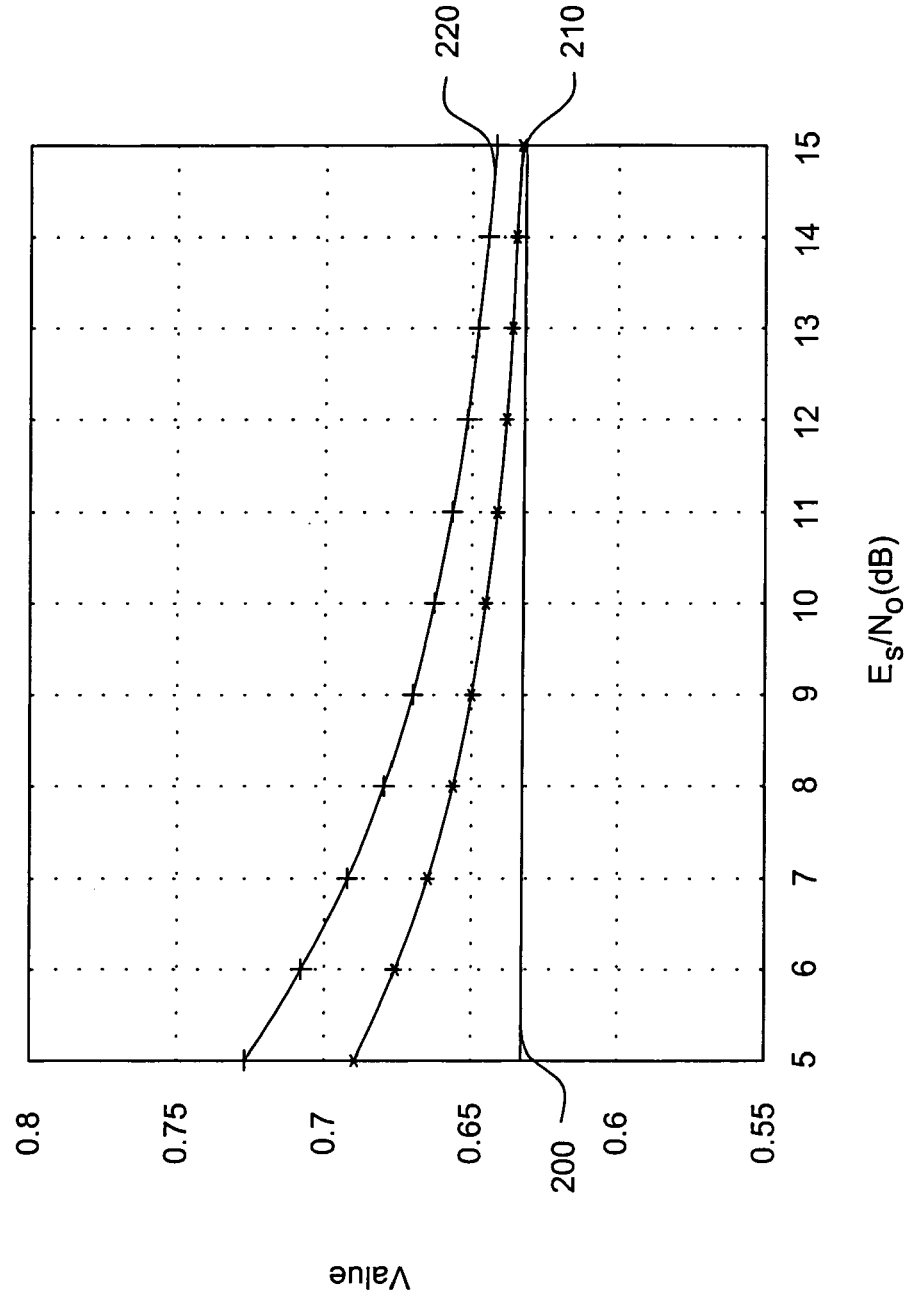
FIG. 2 is a graph illustrating the decision boundary estimation with respect to SIR according to an aspect of the invention.

The graph of FIG. 2 illustrates the precision of the decision boundary estimation method with respect to the SIR, $E_S/N_0$, using expression (4a) or (4b), as appropriate, according to the aspect of the invention as compared to conventional methods that base decision boundary estimations on signal power or variance. As illustrated in FIG. 2, the estimate 210 according to the aspect of the invention exhibits less bias with respect to the decision boundary value 200 than does the conventional signal power/variance based methods estimate 220. The increased bias present in the signal power/variance based estimate 220 can be attributed to the use of non-linear transformations, such as square roots. In addition to a larger bias, such power/variance based estimates also tend to result in noisier boundary estimates. Accordingly, Applicants' method is not only simpler and faster to implement than conventional boundary estimate methods, but it also provides a lower bias, which results in less noisy boundary estimates.

Even the lower amounts of bias, however, may be undesirable in 16-QAM demodulation, since 16-QAM is very sensitive to errors in decision boundaries. For example, decision boundary errors of up to only 6–7% may be tolerated for HSDPA. Therefore, according to another aspect of the invention, a technique for compensating the bias to provide even more accurate boundary estimates is disclosed.

Estimation bias depends on the SIR according to the following relationship:

$$\epsilon(\hat{D}) = D + f(SIR) \quad \text{expression (5)}$$

where f(SIR) is a function that increases with decreasing SIR.

Since the bias term f(SIR) depends on the SIR, which we want to estimate, bootstrap methods can be used to eliminate the bias term. Bootstrap methods involve statistical analyses that use simulation to calculate standard errors, for which compensating values, such as bias correction values, can then be calculated. The compensating values are calculated using mathematical equations to compensate for the errors. These values may be calculated as needed, e.g., each time the SIR changes significantly, or may be predetermined through calculations and tabulated with reference to the SIR value.

As can be appreciated from FIG. 2, the bias is less problematic at high SIRs. In addition, bootstrap bias elimination has the negative effect of increasing variance in the decision boundary estimate. Therefore, the need for bias correction can be limited to low SIRs. In quantitative terms, the block error rate ("BLER") on the HS-PDSCH declines steeply when the bias is above a certain threshold value, which can be designated as an SIR threshold, $SIR_{threshold}$. The bootstrap method can therefore be represented as:

$$\tilde{D} = \hat{D} - \hat{B} \quad \text{expression (6)}$$

where $\hat{D}$ is from expression (6) and $\hat{B}$ is the calculated bias correction term. The bias correction term $\hat{B}$ for different SIR value ranges is preferably predetermined and tabulated. For example the bias correction term $\hat{B}$ can be predetermined and tabulated according to expression (7) below.

$$\hat{B} = \begin{cases} a, & \text{if } SIR < SIR_{threshold} \\ 0, & \text{if } SIR \geq SIR_{threshold} \end{cases} \quad \text{expression (7)}$$

where a is a constant.

While the bias correction term $\hat{B}$ may be represented by two tabulated values as shown in expression (7), additional incremental correction values may also be tabulated based on multiple SIR thresholds to increase bias correction precision. For example, expression (8) below shows four tabulated values, 0 and constants a, b, and c, and the corresponding incremental SIR thresholds. Of course larger tables can be employed for even greater resolution in bias correction.

$$\hat{B} = \begin{cases} a, & \text{if } SIR < SIR_{\text{threshold\_a}} \\ b, & \text{if } SIR_{\text{threshold\_a}} \leq SIR < SIR_{\text{threshold\_b}} \\ c, & \text{if } SIR_{\text{threshold\_b}} \leq SIR < SIR_{\text{threshold\_c}} \\ 0, & \text{if } SIR \geq SIR_{\text{threshold\_c}} \end{cases} \quad \text{expression (8)}$$

Figure 3:
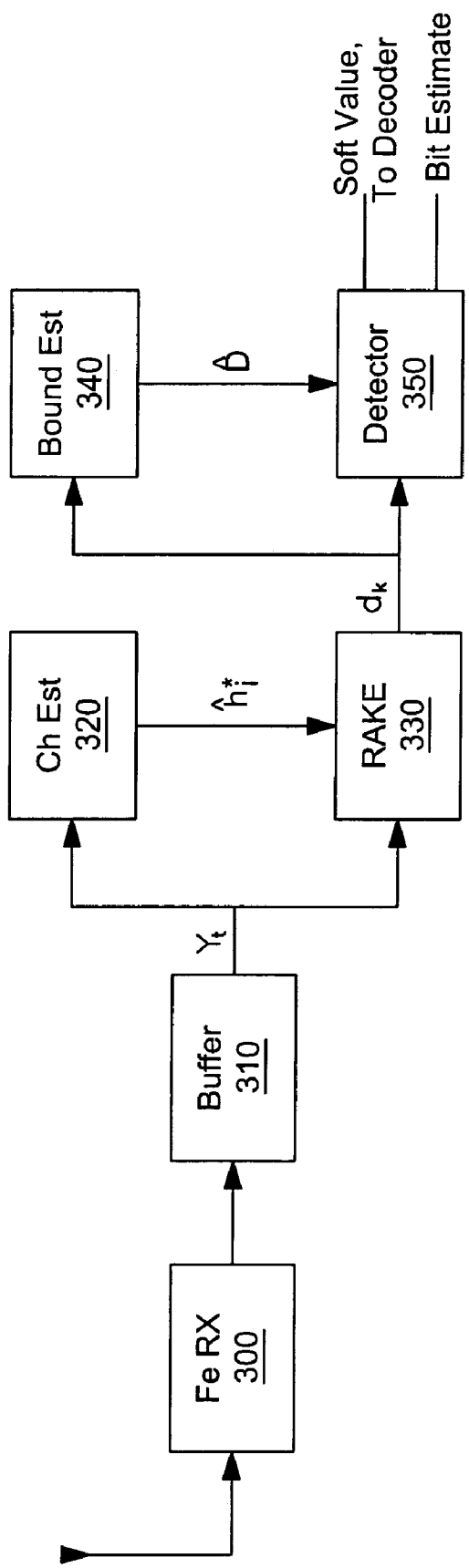
FIG. 3 is a block diagram illustrating a boundary estimation system according to an aspect of the invention.

A block diagram illustration of the boundary estimation system according to an aspect of the invention is shown in FIG. 3. The received signal is down converted and digitally sampled in the front end receiver 300. The digital samples are stored in a buffer 310. The output $(y_t)$ of the buffer is provided to a channel estimator 320, which despreads the pilot channel and estimates the channel weight for each radio channel tap, $\hat{h}_1^*$. The output from the buffer is also provided to a RAKE receiver 330, which despreads the data channels and combines the signals into received 16-QAM symbol estimates. The channel tap estimates $\hat{h}_1^*$ from the channel estimator 320, are provided to the RAKE receiver 330. The output $d_k$ of the RAKE receiver 330, determined according to expression (2), is provided to a decision boundary estimator 340, which calculates the reference point $\hat{D}$ (or $\hat{D}_I, \hat{D}_Q$) and estimates the decision boundaries in accordance with an aspect of the invention described further below with reference to FIG. 5. The estimated decision boundaries are then forwarded to a detector 350 to compute the log-likelihood ratios, which are then used for decoding in the channel decoder (not shown).

Figure 5:
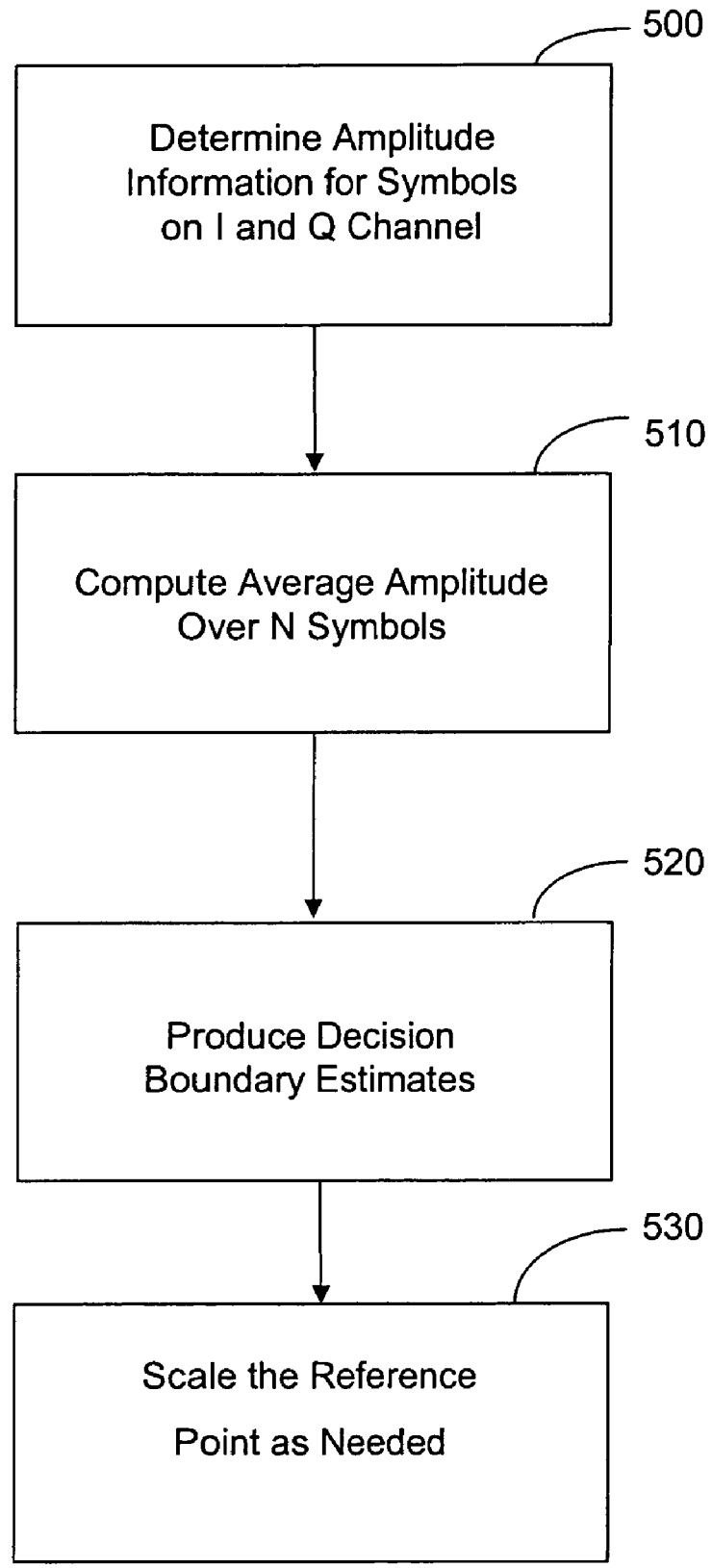
FIG. 5 is a flow chart illustrating a boundary estimation method according to an aspect of the invention.

The flow chart of FIG. 5 illustrates the decision boundary estimation method performed in the decision boundary estimator 340 according to an aspect of the invention. Amplitude information is determined for both the in-phase (I) and quadrature phase (Q) channels over N received despread symbols (step 500). The average amplitude over N symbols is computed according to either expression (4a) or (4b) above (step 510) to determine the corresponding reference point. The decision boundaries are estimated based on the reference point (step 520). Using the linear computations of either expression (4a) or (4b), the average amplitude is computed quickly and efficiently, which reduces overhead, such as memory requirements, and produces less noisy boundary estimates.

If necessary due to the use of higher order modulation, the reference point can be scaled (step 530). For example, where a 64-QAM signal is being processed, three reference points are required, each of which can be derived in the control unit 460 from scaled versions of the 16-QAM reference point. If expression (4a) yields a reference point $\hat{D}=4$. This reference point becomes the middle value of the three reference points for the 64-QAM signal. The value of $\hat{D}$ is scaled by a multiplying factor of, for example, 0.5 and 1.5 to yield additional reference points of 2 and 6, such that $\hat{D}_1=2$, $\hat{D}_2=4$, and $\hat{D}=6$.

Bias compensation is performed for added decision boundary estimation precision in accordance with another aspect of the invention. Since the decision boundary estimate is primarily biased at low SIRs, (see expression (5)), 16-QAM detection preferably includes bias correction at lower SIRs.

Figure 4:
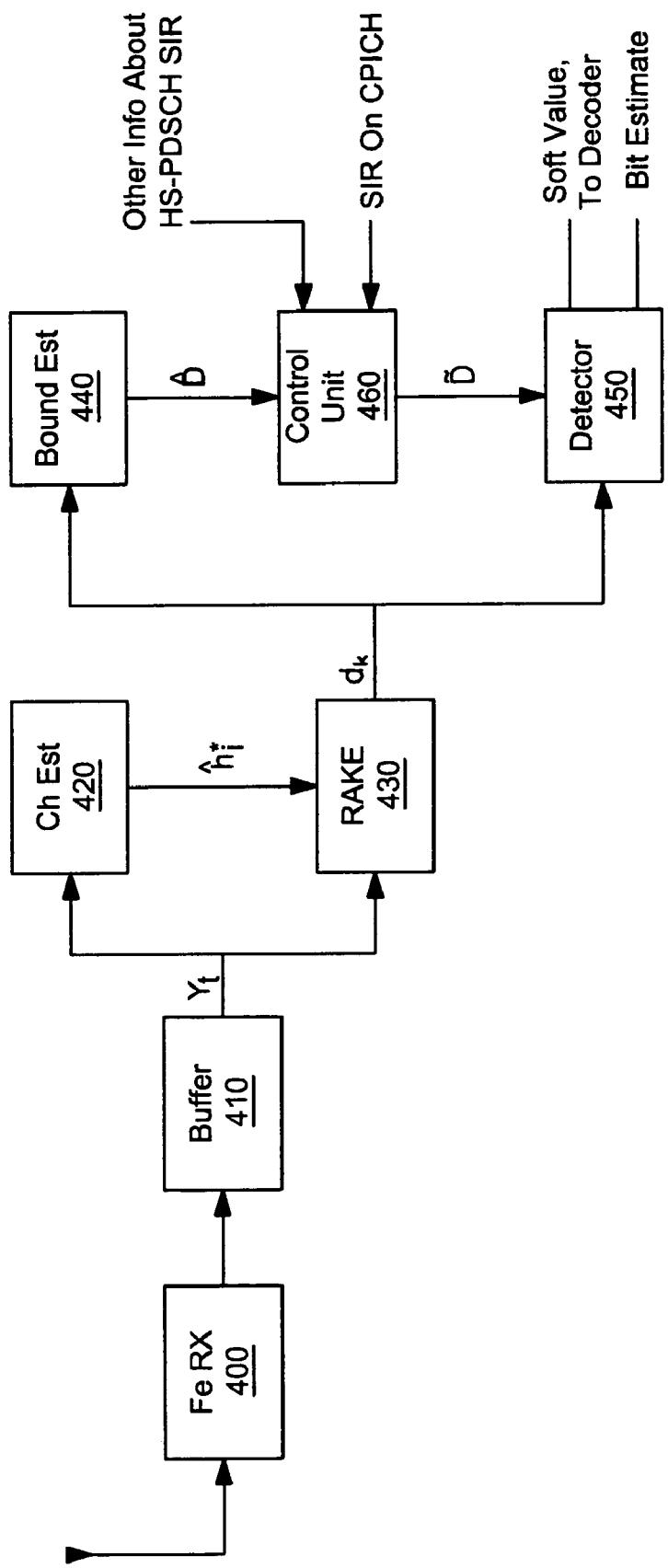
FIG. 4 is a block diagram illustrating a boundary estimation system with bias compensation according to another aspect of the invention.

A block diagram illustration of a boundary estimation system with bias correction according to another aspect of the invention is shown in FIG. 4. The received signal is down converted and digitally sampled in the front end receiver 400. The samples are stored in a buffer 410. The output ($y_t$) of the buffer is provided to a channel estimator 420, which despreads the pilot channel and estimates the channel weight for each radio channel tap, $\hat{h}_1^*$. The output from the buffer is also provided to a RAKE receiver 430, which despreads the data channels and combines the signals into received 16-QAM symbol estimates. The channel tap estimates $\hat{h}_1^*$ from the channel estimator 420, are provided to the RAKE receiver 430. The output $d_k$ of the RAKE receiver 430, determined according to expression (2), is provided to a decision boundary estimator 440, which calculates the reference point $\hat{D}$ (or $\hat{D}_I, \hat{D}_Q$) and estimates the decision boundaries in accordance with an aspect of the invention described further below with reference to FIG. 6.

The decision boundary estimate is forwarded to a control unit 460, which corrects the bias according to the bootstrap method described above. The control unit 460 may also consider other information in bias correction, such as the SIR estimate on the common pilot channel CPICH, which may be used to account for how the actual channel gain has changed, represented by the factor $\beta$ in expression (3). Moreover, the control unit may consider yet other information about the power setting on the HS-PDSCH, represented by the factor $\alpha$ in expression (3). Such factors may include history about previous power settings on HS-PDSCH, the current modulation and channel code rate, and whether the current HS-PDSCH block is a retransmission or not. For example, when the current HS-PDSCH block is a retransmission, then the power setting $\alpha$ may be significantly lower than that of the first transmission. The HS-PDSCH SIR may then change significantly.

The bias corrected decision boundary estimate $\tilde{D}=\hat{D}-\hat{B}$ is used to detect the estimated 16-QAM symbol and compute log-likelihood ratios for the received bits in a detector 450. The log-likelihood ratios are then channel decoded in a channel decoder (not shown) and made available for further processing in the receiver.

Figure 6:
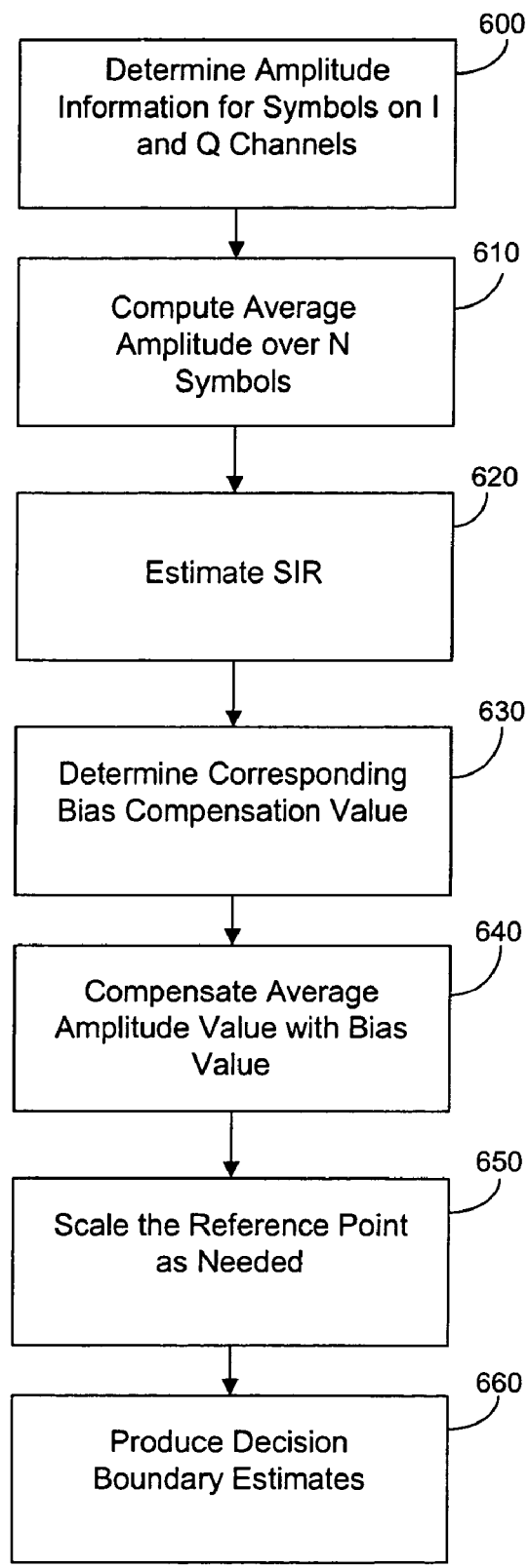
FIG. 6 is a flow chart illustrating a boundary estimation method with bias compensation according to another aspect of the invention.

The flow chart of FIG. 6 illustrates the bias corrected decision boundary estimation method performed in the decision boundary estimator 440 and control unit 460 according to this aspect of the invention. Amplitude information is determined for both the in-phase (I) and quadrature phase (Q) channels over N received despread symbols (step 600) and the average amplitude over N symbols is computed according to expression (6) (step 610) in the decision boundary estimator 440.

The SIR value is estimated (step 620) based on the average amplitude (from step 610) and signal strength and interference estimates of the pilot channel performed by the channel estimator 420 using well known techniques. The interference estimate of the pilot channel is scaled for the data channel using known techniques. One such known technique is described in U.S. application Ser. No. 09/996,513, entitled "Methods and Apparatus for Channel Estimation Using Plural Channels," by Johan Nilsson et al., which is incorporated herein by reference.

Once the SIR is estimated, the corresponding bias compensation value can be determined (step 630) in the control unit 460 using the bootstrap methods described above, for example, using tabulated values according to expression (7) or (8), or another table. The average amplitude value is compensated in the control unit 460 using the bias value (step 640) according to expression (6), and the reference point is determined. If necessary due to the use of higher order modulation, the reference point can be scaled (step 650) as described above.

The compensated decision boundary estimates are produced at the control unit 460 (step 660) based on the reference point and provided to the detector 450 for detection as described above.

Although the above description refers mainly to 16-QAM, it will be understood by one of ordinary skill in this art that the claimed systems and methods are not limited to this case. For example, higher order modulation scenarios, such as 64-QAM, 256-QAM, and the like, are also intended to be within the scope of the claimed systems and methods. For instance, three sets of decision boundaries are required for the 64-QAM case; however, as discussed above, these additional boundaries are only scaled versions of the 16-QAM case.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for estimating M-QAM symbol constellation decision boundaries for a received signal, comprising the steps of:

determining amplitude information for in-phase and quadrature phase components of the received signal over a number of symbols;

determining an average of the absolute value of the amplitude information of the in-phase components over the number of symbols;

determining an average of the absolute value of the amplitude information of the quadrature phase components over the number of symbols; and determining a reference coordinate for producing the decision boundary estimates based on the determined average absolute values of the in-phase and quadrature phase components, so as to be able to determine the received symbols.

2. The method of claim 1, comprising the additional step of performing bias compensation of the determined reference coordinate to produce bias corrected decision boundary estimates.

3. The method of claim 2, wherein the bias compensation is based on an estimated signal-to-interference ratio (SIR) of the received signal.

4. The method of claim 3, wherein the step of performing bias compensation comprises selecting a bias compensation value from a table of predetermined values, said selected bias compensation value corresponding to a range of SIRs that includes the estimated SIR.

5. The method of claim 4, wherein the bias compensation value is subtracted from the reference coordinate to perform bias compensation.

6. The method of claim 1, wherein the received signal is a data channel in a communication system.

7. The method of claim 6, wherein the data channel is a high speed physical downlink shared channel (HS-PDSCH).

8. The method of claim 1, wherein the received signal is a 16-QAM modulated signal.

9. The method of claim 1, comprising the additional step of scaling the reference coordinate to obtain a plurality of dimensional reference coordinates when the received signal is a higher order M-QAM modulated signal.

10. A system for estimating M-QAM symbol constellation decision boundaries for a received signal, comprising:

logic that determines amplitude information for in-phase and quadrature phase components of the received signal over a number of symbols;

logic that determines an average of the absolute value of the amplitude information of the in-phase components over the number of symbols;

logic that determines an average of the absolute value of the amplitude information of the quadrature phase components over the number of symbols; and logic that determines a reference coordinate for producing the decision boundary estimates based on the determined average absolute values of the in-phase and quadrature phase components, so as to be able to determine the received symbols.

11. The system of claim 10, further comprising logic that performs bias compensation of the determined reference coordinate to produce bias corrected decision boundary estimates.

12. The system of claim 11, wherein the bias compensation is based on an estimated SIR of the received signal.

13. The system of claim 12, wherein the logic that performs bias compensation comprises logic that selects a bias compensation value from a table of predetermined values, said selected bias compensation value corresponding to a range of SIRs that includes the estimated SIR.

14. The system of claim 13, wherein the bias compensation value is subtracted from the reference coordinate to perform bias compensation.

15. The system of claim 10, wherein the received signal is a data channel in a communication system.

16. The system of claim 10, wherein the received signal is a 16-QAM modulated signal.

17. The system of claim 10, comprising additional logic that scales the reference coordinate to obtain a plurality of dimensional reference coordinates when the received signal is a higher order M-QAM modulated signal.

18. A method for estimating M-QAM symbol constellation decision boundaries for a received signal, comprising the steps of:

determining amplitude information for in-phase and quadrature phase components of the received signal over a number of symbols;

determining an average of the absolute values of the amplitude information of the in-phase components and quadrature phase components over the number of symbols; and determining a reference value for producing the decision boundary estimates based on the determined average absolute values of the in-phase and quadrature phase components, so as to be able to determine the received symbols.

19. The method of claim 18, comprising the additional step of performing bias compensation of the determined reference value to produce bias corrected decision boundary estimates.

20. The method of claim 19, wherein the bias compensation is based on an estimated SIR of the received signal.

21. The method of claim 20, wherein the step of performing bias compensation comprises selecting a bias compensation value from a table of predetermined values, said selected bias compensation value corresponding to a range of SIRs that includes the estimated SIR.

22. A system for estimating M-QAM symbol constellation decision boundaries for a received signal, comprising:

logic that determines amplitude information for in-phase and quadrature phase components of the received signal over a number of symbols;

logic that determines an average of the absolute values of the amplitude information of the in-phase components and quadrature phase components over the number of symbols; and logic that determines a reference coordinate for producing the decision boundary estimates based on the determined average absolute values of the in-phase and quadrature phase components, so as to be able to determine the received symbols.

23. The system of claim 22, further comprising logic that performs bias compensation of the determined reference coordinate to produce bias corrected decision boundary estimates.

24. The system of claim 23, wherein the bias compensation is based on an estimated signal-to-interference ratio (SIR) of the received signal.

25. The system of claim 24, wherein the logic that performs bias compensation comprises logic that selects a bias compensation value from a table of predetermined values, said selected bias compensation value corresponding to a range of SIRs that includes the estimated SIR.

26. A computer readable medium containing a computer program for estimating M-QAM symbol constellation decision boundaries, wherein the computer program performs the steps of:

determining amplitude information for in-phase and quadrature phase components of the received signal over a number of symbols;

determining an average of the absolute value of the amplitude information of the in-phase components over the number of symbols;

determining an average of the absolute value of the amplitude information of the quadrature phase components over the number of symbols; and determining a reference coordinate for producing the decision boundary estimates based on the determined average absolute values of the in-phase and quadrature phase components, so as to be able to determine the received symbols.

27. The computer readable medium of claim 26, wherein the computer program performs the additional step of performing bias compensation of the determined reference coordinate to produce bias corrected decision boundary estimates.

28. The computer readable medium of claim 27, wherein the bias compensation is based on an estimated signal-to-interference ratio (SIR) of the received signal.

29. The computer readable medium of claim 28, wherein the step of performing bias compensation comprises selecting a bias compensation value from a table of predetermined values, said selected bias compensation value corresponding to a range of SIRs that includes the estimated SIR.

30. User equipment for estimating M-QAM symbol constellation decision boundaries when a signal is received by the user equipment, the user equipment comprising:

logic that determines amplitude information for in-phase and quadrature phase components of the received signal over a number of symbols;

logic that determines an average of the absolute values of the amplitude information of the in-phase components and quadrature phase components over the number of symbols; and logic that determines a reference coordinate for producing the decision boundary estimates based on the determined average absolute values of the in-phase and quadrature phase components, so as to be able to determine the received symbols.

* * * * *

UNITED STATES PATENT AND TRADEMARK OFFICE
CERTIFICATE OF CORRECTION

| | |
|---|---|
| PATENT NO. | : 7,154,966 B2 |
| APPLICATION NO. | : 10/609917 |
| DATED | : December 26, 2006 |
| INVENTOR(S) | : Peter Malm et al. |

Page 1 of 1

It is certified that error appears in the above-identified patent and that said Letters Patent is hereby corrected as shown below:

Col. 9, Line 25: Change "and $\hat{D} = 6$ ." to --and $\hat{D}_3 = 6$ .--

Signed and Sealed this

Tenth Day of July, 2007

JON W. DUDAS
*Director of the United States Patent and Trademark Office*